H. MUELLER.
WASHER GASKET.
APPLICATION FILED JAN. 30, 1909.
936,554.
Patented Oct. 12, 1909.
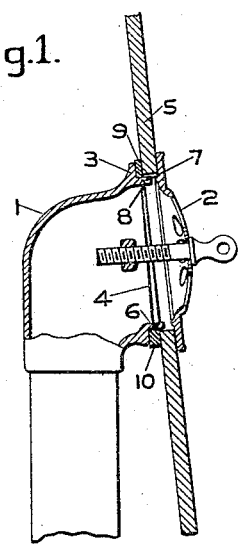
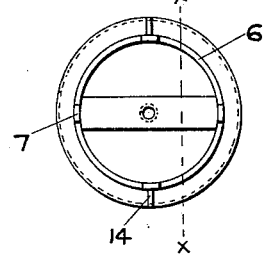
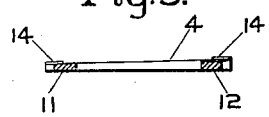
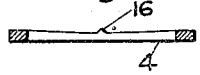
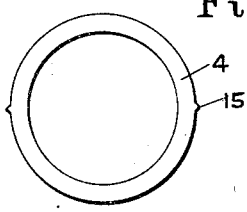
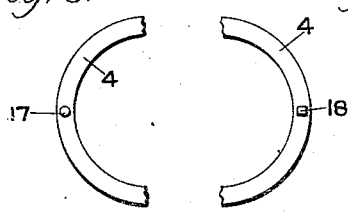
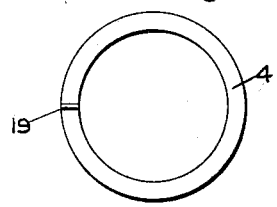
Witnesses.
Chester W. Hathaway
Virginia Hamilton
Inventor.
Henry Mueller.
by John L. Waddell
Attorney.

UNITED STATES PATENT OFFICE.

HENRY MUELLER, OF DECATUR, ILLINOIS, ASSIGNOR TO H. MUELLER MANUFACTURING COMPANY, OF DECATUR, ILLINOIS, A CORPORATION OF ILLINOIS.

WASHER-GASKET.

936,554.

Specification of Letters Patent.

Patented Oct. 12, 1909.

Application filed January 30, 1909. Serial No. 475,152.

*To all whom it may concern:*

Be it known that I, HENRY MUELLER, a citizen of the United States, and resident of Decatur, Macon county, State of Illinois, have invented certain new and useful Improvements in Washer-Gaskets; and my preferred manner of carrying out the invention is set forth in the following full, clear, and exact description, terminating with claims particularly specifying the novelty.

This invention relates to baths and closets and more especially to bath and basin fittings and the object of the same is to facilitate the attachment of a fitting to a bath tub and the setting of an overflow grate.

Another object is to lessen the labor and the expense of manufacture by reducing the body of the device to a minimum without sacrificing the utility of the fitting or producing difficulty with its use in setting same up in cramping quarters.

To this end the invention consists in a washer gasket adapted to fit around the opening of a waste and to be clamped between the flanged end of said waste and the wall of the tub in which the same is attached.

The gasket is preferably circular in shape although it may be readily adapted to openings of different shapes, having upon one surface a marker to indicate the proper adjustment of the gasket upon the fitting prior to final attachment; the following specification sets forth certain embodiments of this idea in two forms, in one of which the marker is integral with the gasket and located upon one of its flat surfaces; whereas in the other it may be mounted upon the perimeter of the same and other forms or modifications are also herein shown.

In the drawings forming a part of this specification, Figure 1 is a sectional view through a head of an overflow showing the gasket adapted to the angular wall of the tub; Fig. 2 is a front elevation of the head or inlet of the overflow showing the gasket in position with the marker upon the upper flat surface of the same; Fig. 3 is a cross section view of the gasket on the line *x x*, showing the relative thickness of the two extremes of the body of the gasket and the markers upon its flat surface; Fig. 4 is a cross section of the gasket showing the shape of marker; Fig. 5 is a gasket in elevation showing the markers mounted upon the exterior perimeter thereof; Fig. 6 is a fragmentary view of a gasket in elevation showing a modification of the markers on the flat surface thereof; Fig. 7 is a gasket in elevation showing a marker on one of its flat surfaces; Fig. 8 is a fragmentary portion of a gasket in elevation showing a modification of a form of the marker on the flat surface thereof.

In setting up a usual bath tub and its appurtenances, it is the general practice to bring a tub into the position which it will occupy, connecting the supplies either before or after the tub is located, fitting the lower part or portion of the waste outlet and while the tub is in such position, adjust the waste fitting by taking the head of the same, holding a washer or gasket thereon, bringing it to the outer surface or against the outer wall of the bath tub, but so holding it with the end until the grate is similarly adjusted and the same tightened sufficiently to clamp the gasket between the tub wall and the face of the overflow, in order to hold the gasket in its position, then loosening and tightening the grate and the overflow head, meanwhile adjusting the gasket in order to get the same to correspond with the incline or angle of the outer wall of the tub. All of this work must necessarily be done in cramping quarters where the rim stands out over the tub and the tub stands quite close to the wall, a very difficult position for a workman to make a proper connection because of a limited space, the uncertainty of the light, and impossibility of using tools. By my present invention I do away with the necessity of adjusting the gasket around the face of the overflow after it is placed in position and make it possible to make a careful, neat, certain job of fitting the overflow to the tub by providing an indicator on the gasket which gives to the workman the variance of thickness in certain portions of the gasket, which makes it readily adaptable to the different angles of the tub against which said overflow head must contact with the gasket intervening.

Referring to the accompanying drawings the numeral 1 indicates the head of a combined waste and overflow connected with a grate 2 and bearing a flange 3 which clamps the gasket 4 against the wall of the tub as 5. The said head 1 is provided with a shoulder or rib 6 which extends around the entire perimeter of the said opening and which has located therein and integral therewith, lugs as 7 which extend beyond and above the flat surface of rib 6 against the flange 3 of which surrounding the rib 6, is placed the gasket 4. The perimeter of the gasket will preferably fit close around said shoulder and have great tendency to retain the gasket about the shoulder and in bringing it ready for use after it is once fixed in its position, said retention being by frictional fit only. The said lugs 7 are provided with a groove 8 which permits of them being broken off or removed, allowing the wall of the bath tub or lavatory to fit snugly against the gasket 4 in wares where the aperture is smaller than the customary aperture in tubs, thus leaving only the rib 6 which extends entirely around the perimeter of the opening in the waste.

The gasket 4 which may be of rubber, fiber or any suitable packing material is provided with a thin edge or portion and opposite thereto would be the thickest point of its portion which is readily adapted to fit against a tub having angular exterior walls as will be seen in Fig. 1, 9 representing its minimum thickness and 10 the maximum thickness, and likewise the same thickness is shown in Fig. 3 at 11 and 12, but owing to the point past the center which the view shows, possibly the maximum and minimum thicknesses would not be reached. Upon one face of said gasket 4 is provided a marker or indicator as 14 as shown in Figs. 2 and 3, said marker being integral with said gasket and extends from the inside to the outside of the same across the entire face and is mounted to indicate the minimum and maximum thicknesses of the gasket in order that when it is taken up and adapted to the fitting above set forth, the minimum as 9 may be placed at a point where the wall of the tub extends upward at a greater angle than the flanged face of the waste opening, and the larger or maximum portion 10 adapted to fit the tub where such angle is less as compared to the flange of the waste outlet when the overflow is set perpendicular to the wall of the room in which it is installed, or perpendicular to its base. The indicators therein are preferably of a form shown at 16 in Fig. 4, and they may be of any desired form or shape.

As I have herein stated, one of the objects of the invention is to provide a construction wherein the gasket of varying degrees of thickness may be marked integral therewith, and the appending claims have been drawn directly to such an arrangement; but I do not wish to be understood as limiting myself to any specific form or marking or to a construction wherein the marking is in part or in full indicated by the different colors of material or marks or creases therein, as it will be obvious that said marking, or indicating the varying degrees in the portions of body of the gasket, may be otherwise arranged and so far as some of the claims are concerned the particular nature of said mark is not material.

It will be readily understood that the gasket as herein described may appear in a form as shown in Fig. 5 wherein the marker indicating the minimum or maximum thickness, or either of them, is located on the exterior perimeter of the gasket as at 15 being an outward extension mounted on the exterior perimeter of the gasket 4, and the same may be indicative of the degree of thickness only and appear singly instead of in pairs. In any event the shape of both the markers as shown in Fig. 3 and Fig. 5 would be the same as indicated in Fig. 4, as at the indicator 16, they being integral with the gasket at the point of indication. I apprehend that said marker may appear at any point desired it being optional with the manufacturer and a various number of shapes may be adapted of which those as indicated at 17 and 18 in Figs. 6 and 8 respectively are modifications; that the marker or indicator may appear at any point upon the face or perimeter of the gasket so long as it does not interfere with its use as indicated.

I show a still further modification of my device in Fig. 7 in which the indicator 19 is shown as a projection across the face of the gasket 4. This projection 19 is shown by preference only, as a marker may assume any shape or be of any size and be either a depression or a projection, so long as the spirit of the invention is conveyed, or the same may be used one or more times on the face or perimeter of the gasket as may be found advisable to the manufacturer or user.

Having thus fully described my invention, what I claim as new is:

1. In an article of manufacture, a packing gasket of varying thickness and means thereon for indicating the same.

2. In an article of manufacture, a packing gasket of varying dimensions and means on the face indicating such variation.

3. In an article of manufacture, a packing gasket of varying degrees of thickness and means thereon for indicating the extreme of such variation.

4. In an article of manufacture, a packing gasket of varying degrees of thickness and means thereon for indicating the maximum thickness thereof.

5. In an article of manufacture, a packing gasket of varying degrees of thickness and means thereon for indicating the minimum thickness thereof.

6. In an article of manufacture, a packing gasket of varying degrees of thickness and means thereon for indicating the maximum and minimum variance thereof.

7. In an article of manufacture, a rubber packing gasket of varying degrees of thickness having a marker on and integral with its face substantially as described.

8. In an article of manufacture, a rubber packing gasket of varying degrees of thickness and markers on its face indicating the minimum and maximum of such dimensions.

In testimony whereof, I have hereunto subscribed my signature, this 29th day of December, A. D. 1908.

HENRY MUELLER.

Witnesses:
  VIRGINIA HAMILTON,
  JOHN L. WADDELL.